United States Patent [19]

Takahashi

[11] Patent Number: 5,625,786
[45] Date of Patent: Apr. 29, 1997

[54] MICROPROGRAM MEMORY OUTPUT CIRCUIT FOR SELECTIVELY OUTPUTTING FIELDS OF MICROINSTRUCTION WORD TO A PLURALITY OF DATA TERMINALS

[75] Inventor: Junichi Takahashi, Tokyo, Japan

[73] Assignee: NEC Corporation, Tokyo, Japan

[21] Appl. No.: 596,700

[22] Filed: Feb. 5, 1996

Related U.S. Application Data

[63] Continuation of Ser. No. 19,275, Feb. 18, 1993, abandoned.

[30] Foreign Application Priority Data

Feb. 18, 1992 [JP] Japan ................. 4-029821

[51] Int. Cl.⁶ ........................................ G06F 9/30
[52] U.S. Cl. ............................ 395/571; 395/598
[58] Field of Search ................ 364/DIG. 1 MS File, 364/DIG. 2 MS File; 395/375, 882

[56] References Cited

U.S. PATENT DOCUMENTS 4,099,229  7/1978  Kancler ................... 395/375

OTHER PUBLICATIONS

Kuban et al., "Testability Features of The MC68020" Internationl Test Conference (1984) pp. 821–827 (Paper 24.4).

Primary Examiner—Robert B. Harrell
Attorney, Agent, or Firm—Foley & Lardner

[57] ABSTRACT

Other than a second bus selector to which first through fourth fields are entered with a 64-bit long MROM data bus divided into signals for each 16-bit field, a first bus selector to which the second and fourth fields are entered is provided. The bus selectors are simultaneously controlled by a bus selector/address controller so that a 16 or 32-bit external output terminal may generate a microinstruction word without altering the architecture of the circuit. Thus, it becomes possible to selectively generate the microinstruction word stored within the microprogram memory to external output terminals having different bit lengths.

16 Claims, 6 Drawing Sheets

MICROPROGRAM MEMORY OUTPUT CIRCUIT FOR SELECTIVELY OUTPUTTING FIELDS OF MICROINSTRUCTION WORD TO A PLURALITY OF DATA TERMINALS

This application is a Continuation of application Ser. No. 08/019,275, filed Feb. 18, 1993 now abandoned.

BACKGROUND OF THE INVENTION

The present invention relates to a microprogram memory output circuit and, in particular, to a microprogram memory output circuit in verification of data within the microprogram memory of a semiconductor integrated circuit.

A circuit for generating microinstructions stored with a conventional microprogram memory to the external output terminals is described with reference to the block diagram of FIG. 1. The circuit comprises a microprogram ROM 101 (hereinafter referred to as MROM) having a 48-bit long microinstruction word, a bus selector 107 taking a MROM data bus MD bit (47 to 40) field signal 211 from the MROM 101, MROM data bus MD bit (39 to 32) field signal 212, a MROM data bus MD bit (31 to 24) field signal 213, a MROM data bus MD bit (23 to 16) field signal 214, a MROM data bus MD bit (15 to 8) field signal 215 and a MROM data bus MD bit (7 to 0) field signal 216 as its inputs, a bus selector/address controller 104a for controlling the MROM 101 and the bus selector 107 and an output circuit 108 for transferring the output of the bus selector 107 to the 8-bit long external output terminal 210.

MROM 101 divides the 48-bit long microinstruction selected at MROM address 301, which is entered from bus selector/address controller 104a, into six fields: microinstruction word bits (47 to 40), (39 to 32), (31 to 24), (23 to 16), (15 to 8) and (7 to 0) to generate each bit field of the microinstruction word to the MROM data bus MD bit (47 to 40), (39 to 32), (31 to 24), (23 to 16), (15 to 8) and (7 to 0) field signals 211 through 216 respectively.

FIG. 2 illustrates a block diagram of the bus selector/address controller 104a, which comprises an address generator 110 and a control signal generating unit 111a.

The address generator 110 comprises address incrementing means for incrementing one by one for each clock, means for generating an MROM address to generate as the MROM address 301 and means for generating a carry signal 304 when any carry over takes place from the most significant bit of the MROM address 301. The carry signal 304 is supplied as the trigger signal addressed to the control signal generating unit 111a. When a reset signal 305 becomes effective, the address generator 110 is reset and the MROM address 301 is initialized.

The control signal generating unit 111a has a 3-bit long combination circuit 113, and uses the output of this 3-bit long combination circuit 113 as the bus selector control signal 306.

The 3-bit long combination circuit 113 is initialized to the value "000" when the reset signal 305 becomes effective to sequentially generate the codes "001", "010", "011", "100" and "101" as the bus selector control signal 306 with the carry signal 304 from the address generator 110 as the trigger.

The bus selector 106, as shown in FIG. 3, comprises a local data bus multiplexer 131 and a bus selector control signal decoder 132. The entered field signals 211 through 216 of MROM data bus MD bits (47 to 40), (39 to 32), (31 to 24), (23 to 16), (15 to 8) and (7 to 0) are selected by the bus selector control signal 306 to be generated to a local data bus 207, in which, when the bus selector control signal 306 takes the code "000", the MROM data bus MD bit (47 to 40) field signal 211 is selected, and when it takes the code "001", "010", "011" "100", and "101", the MROM data bus MD bit field signals 212 through 216 are each respectively selected. Further, the output means 106 serves to generate the microinstruction word on the local data bus 207 to the external output terminal 210 in synchronism with the external clock signal.

When the reset signal becomes effective, the bus selector/address controller 104a is initialized, and the bus selector 107, in synchronism with the external clock, generates the MROM data bus MD bit (47 to 40) field signal 211 to the local data bus 207. The carry signal 304 resulting from the carryover from the most significant bit of the MROM address 301 causes the bus selector 107 to sequentially generate each field signal 212 through 216 of the MROM data bus MD bit to the local data bus 207 respectively. Therefore, reading of the microinstruction word in synchronism with the external clock may cause all the microinstruction words stored within the MROM to be generated to the external output terminal.

Due to the diversification and the cost reduction of the semiconductor integrated circuit, a microprocessor has been called for which may generate the microinstruction word stored within the microprogram memory to be generated to the external output terminal of different length, for example, 16 or 32-bit external data bus terminal.

The foregoing conventional circuit can cope with the foregoing task, if the microinstruction word is divided into below the bit length of the external output terminal and the circuit is changed in accordance with the bus selector 107, bus selector/address controller 104a and the divided microinstruction word.

However, since a microprocessor must be manufactured for each external output terminal of a different bit length, extra manufacturing time is required which exerts an adverse effect on the cost reduction.

Therefore, an object of the present invention is to eliminate these problems and to provide a novel microprogram memory output circuit which allows the microinstruction word to be selectively generated to output terminals of different bit lengths.

SUMMARY OF THE INVENTION

According to the present invention, there is provided a microprogram memory output circuit comprising:

a microprogram memory having n-bit long microinstruction words;

a first selector means to which, among a first to four microinstruction fields resulting from diving the microinstruction word into four each having the length of m-bits (n≦4 m, n and m are each a positive number), the first and second microinstruction fields are entered to generate to an m-bit long first external output means;

a second selector means to which the first to four microinstruction fields are entered to generate to an m-bit long second external output means;

an address incrementing means for sequentially accessing to the microprogram memory;

a first control means for sequentially controlling for emission the first and second microinstruction fields entered to the first selector means; and a second control means for sequentially controlling for emission the first through fourth microinstruction fields entered to the first selector means;

In the microprocessor of the present invention, the first control means triggers the carry signal from the most significant bit of the microprogram memory address which is generated by the address incrementing means to cause the first selector means to repeatedly generate the first and second microinstruction fields in that order, and the second control means can cause the foregoing trigger signal to generate the fourth, third, second and first microinstruction fields to the second selector means in that order.

In consequence, according to the present invention, in the microprogram memory having the n-bit long microinstruction word, by dividing the microinstruction word into four each comprising not more than m-bits or the like ($n \leq 4$ m, n and m are each a positive number) so that the address of the microprogram memory is incremented or decremented for (X−1), the microinstruction word is read out from the 2 m-bit long external output terminal by 2X times, and it is read out from the m-bit long external output terminal by 4X times to read out all the microinstruction words.

Further, although the arrangement of the present invention is considered to increase in the circuit size as compared with the prior ones, in view of the fact that the semiconductor integrated circuit is developed for each bit length of the external output terminal, it is possible to manufacture in a shorter time period, and the reduction of manufacturing cost can be achieved.

DETAILED DESCRIPTION OF THE PREFERRED EMBODIMENTS

Figure 1:
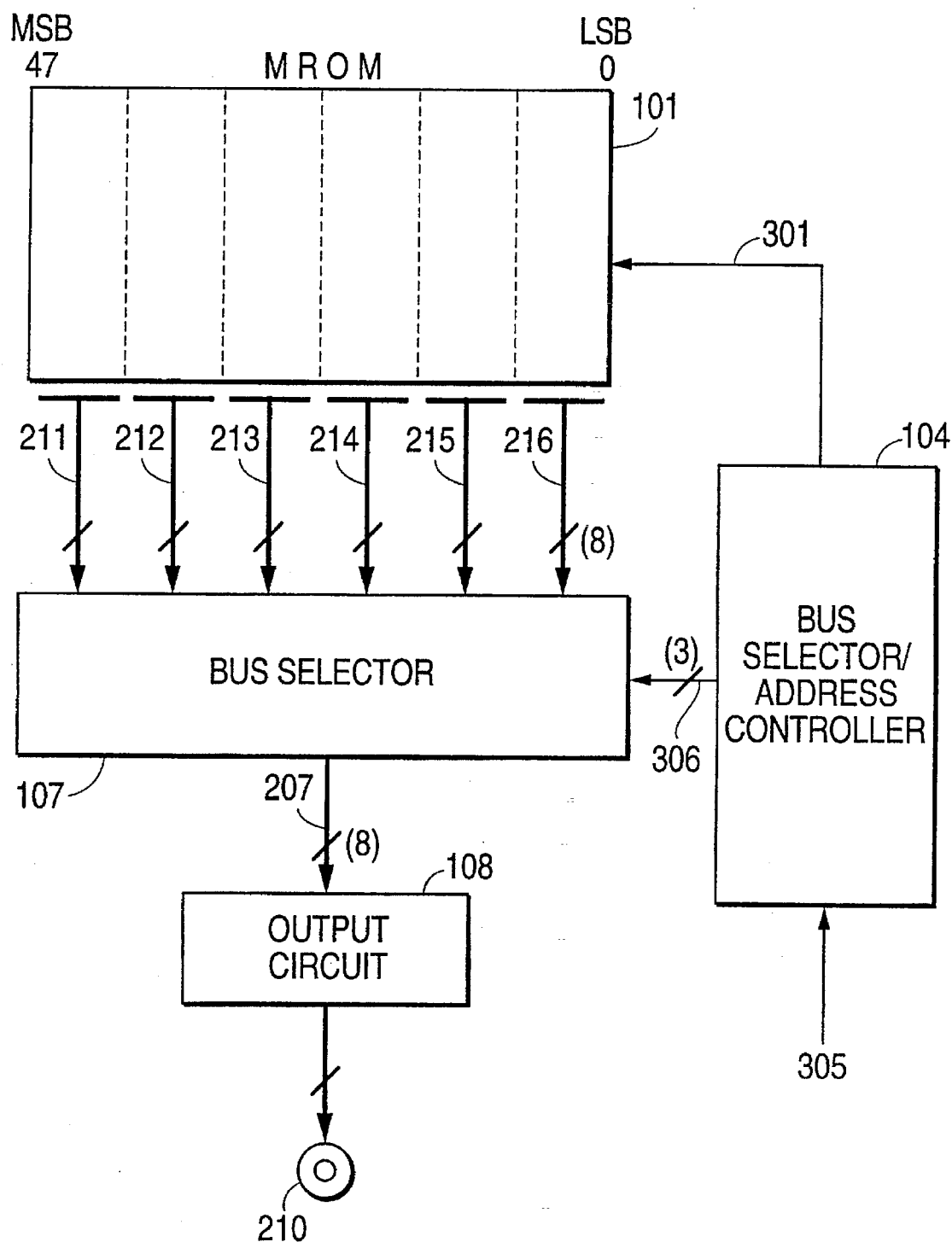
FIG. 1 is a block diagram of the output portion of a conventional microprogram memory.
Figure 2:
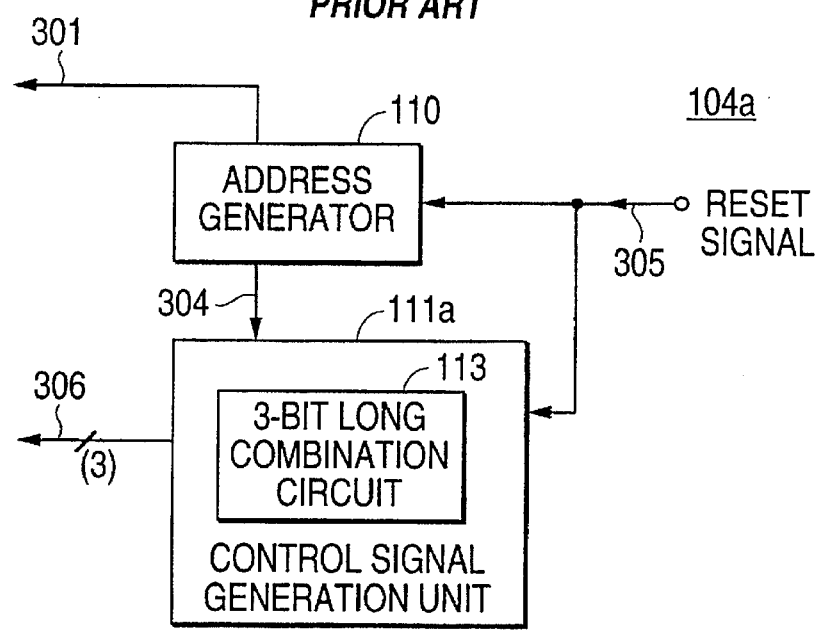
FIG. 2 is a block diagram of a bus selector/address controller of FIG. 1.
Figure 3:
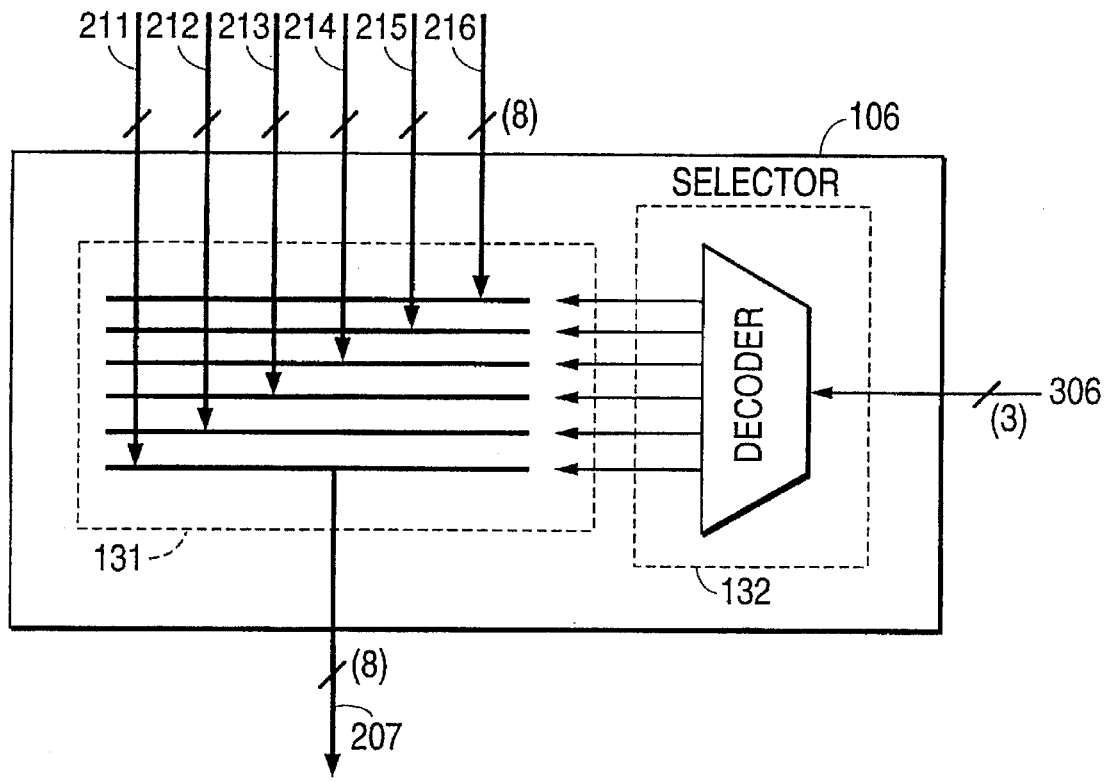
FIG. 3 is a block diagram of the bus selector of FIG. 1.
Figure 4:
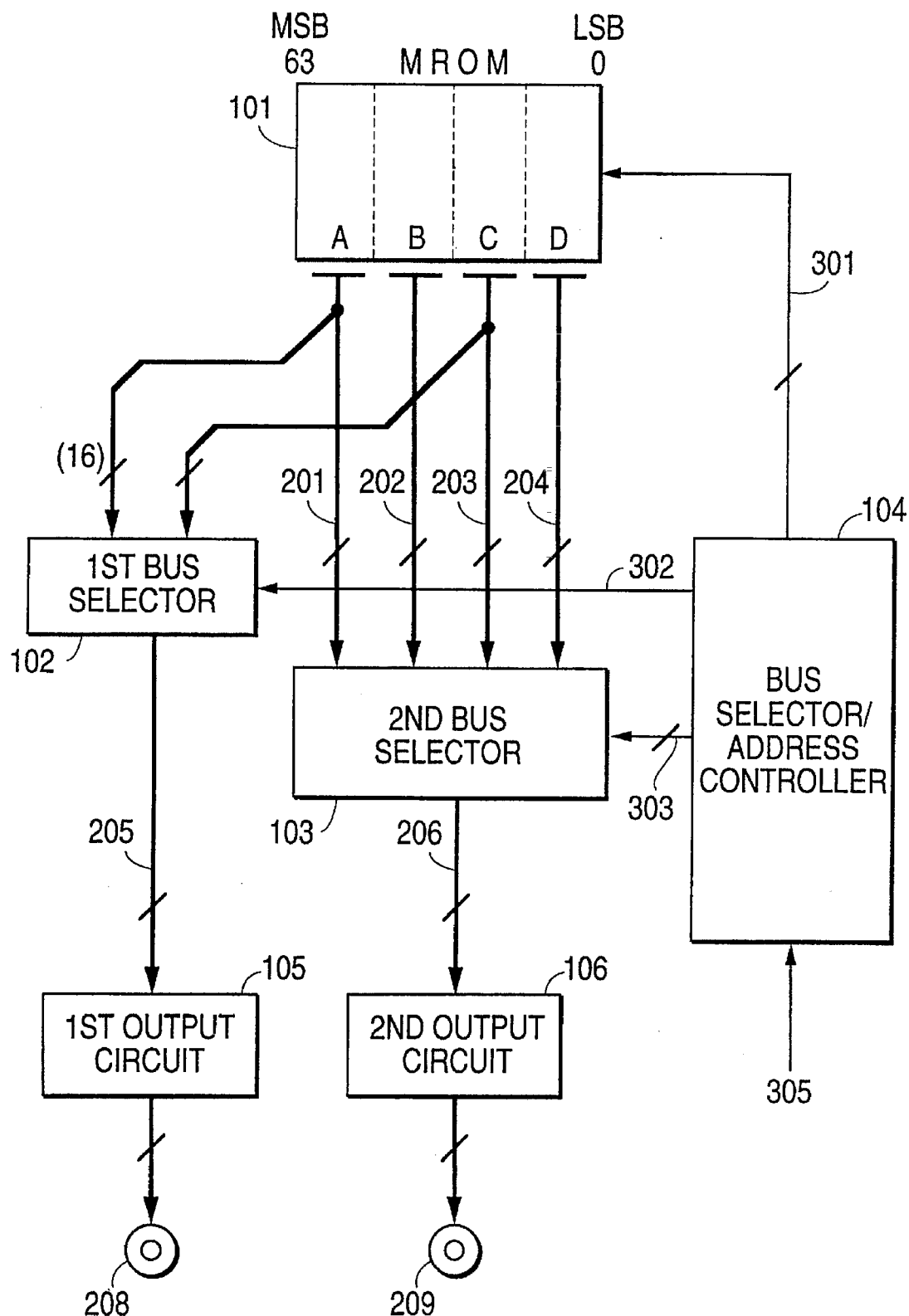
FIG. 4 is a block diagram of a microprogram memory having a 32-bit external data bus terminal according to the present invention.

FIG. 4 is a block diagram illustrating a microprogram embodying the present invention, corresponding to the case of a semiconductor integrated circuit in which the MROM microinstruction word having a 64-bit long microinstruction word is generated to a 32-bit long external data bus terminal.

The microprogram memory according to this embodiment comprises a MROM 101 having a 64-bit long microinstruction word, a first bus selector 102 taking a MROM data bus MD bit (63 to 48) field signal 201 and a MROM data bus MD bit (31 to 16) field signal 203 as the inputs; a second bus selector 103 taking each field signal 201 through 204 comprising the MROM data bus MD bit (63 to 48), (47 to 32), (31 to 16) and (15 to 0) as the inputs; a bus selector/address controller 104 for controlling the MROM 101, first bus selector 102 and second bus selector 103; first output means 105 for transferring the output of the first data bus terminal to the external data bus terminal bits (31 to 16) 208; and second output means 106 for transferring the output of the second bus selector 103 to the external data bus terminal bits (15 to 0) 209.

The MROM 101 divides a group of the 64-bit long microinstruction words selected by the MROM address 301, which is entered from the bus selector/address controller 104, into four fields of the microinstruction word bits (63 to 48), (47 to 32), (31 to 16) and (15 to 0) while generating the bit (53 to 48) field to the MROM data bus MD bit (63 to 48) field signal 201, the bit (47 to 32) field to the MROM data bus MD bit (47 to 32) field signal 202, the bit (31 to 16) field to the MROM data bus MD bit (31 to 16) field signal 203 and the bit (15 to 0) field to the MROM data bus MD bit (15 to 0) field signal 204.

Figure 5:
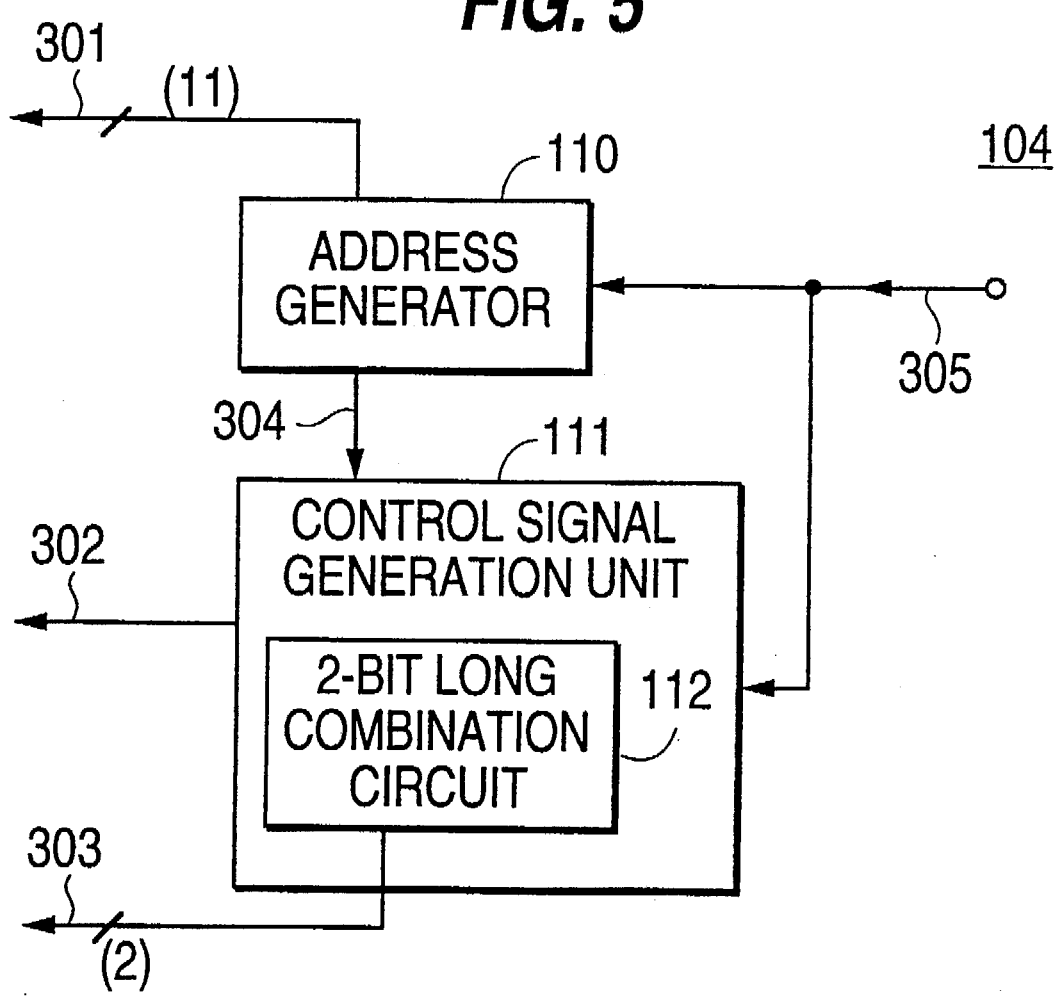
FIG. 5 is a block diagram of the bus selector/address controller of FIG. 4.

The arrangement of the bus selector/address controller 104 is illustrated in the block diagram of FIG. 5. This unit, as the conventional microprogram memory, comprises an address generator 110 and a control signal generating unit 111.

The address generator 110 comprises an address incrementing for incrementing one by one for each clock and a circuit for generating a carry signal 304 when a carry over takes place from the most significant bit of the 11-bit long MROM address 301. This carry signal 304 is supplied as the trigger signal to the control signal generating unit 111. Further, when the reset signal 305 becomes effective, the address generator is reset and the MROM address 301 is initialized.

The control signal generating unit 111 comprises a 2-bit long combination circuit 112, the output of which is used as a signal 303 for controlling the second bus selector. Further, with the least significant bit of the second bus selector control signal 303 as the first bus selector control signal 302, the 2-bit long combination circuit 112, when the reset signal 305 becomes effective, is initialized to the code "11" to sequentially generate the codes "10", "01" and "00" as the second bus selector control signal 303 with the carry signal 304 from the address generator 110 as the trigger. Further, the first bus selector control signal 302 sequentially generates the codes "1", "0", "1" and "0" simultaneously with the second bus selector control signal 303.

Figure 6A:
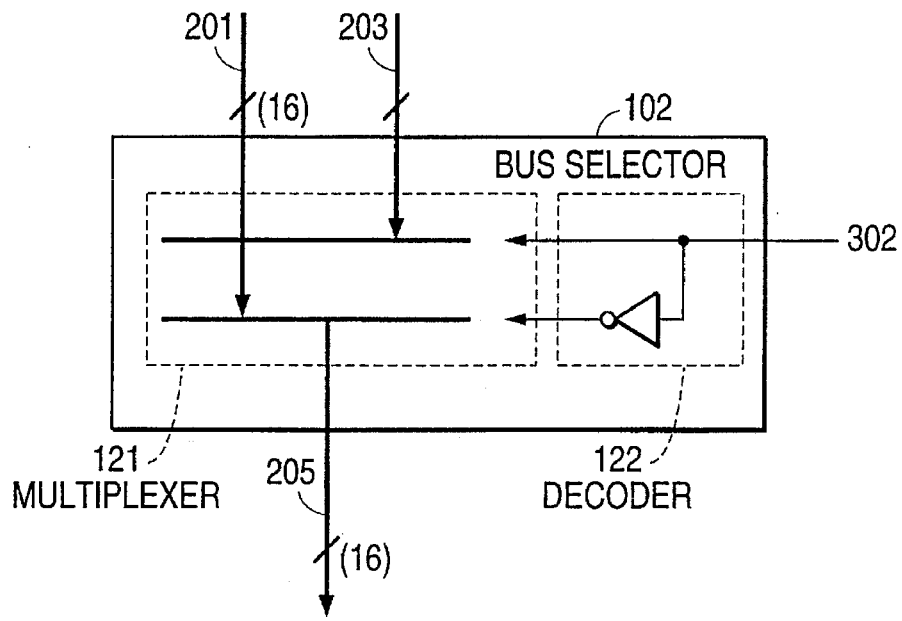
FIG. 6a is a block diagram of the first bus selector of FIG. 4.

The first bus selector 102 comprises the first local data bus multiplexer 121 and the first bus selector control signal decoder 122, as illustrated in FIG. 6(a). The entered MROM data bus MD bit (63 to 48) field signal 201 and MROM data bus MD bit (31 to 16) field signal 203 are selected by the first bus selector control signal 302 to be generated to the first local data bus 205. In this embodiment, when the first bus selector control signal 302 is the code "0", the MROM data bus MD bit (63 to 48) field signal 201 is selected, and when it is the code "1" the MROM data bus MD bit (31 to 16) field signal 203 is selected.

Figure 6B:
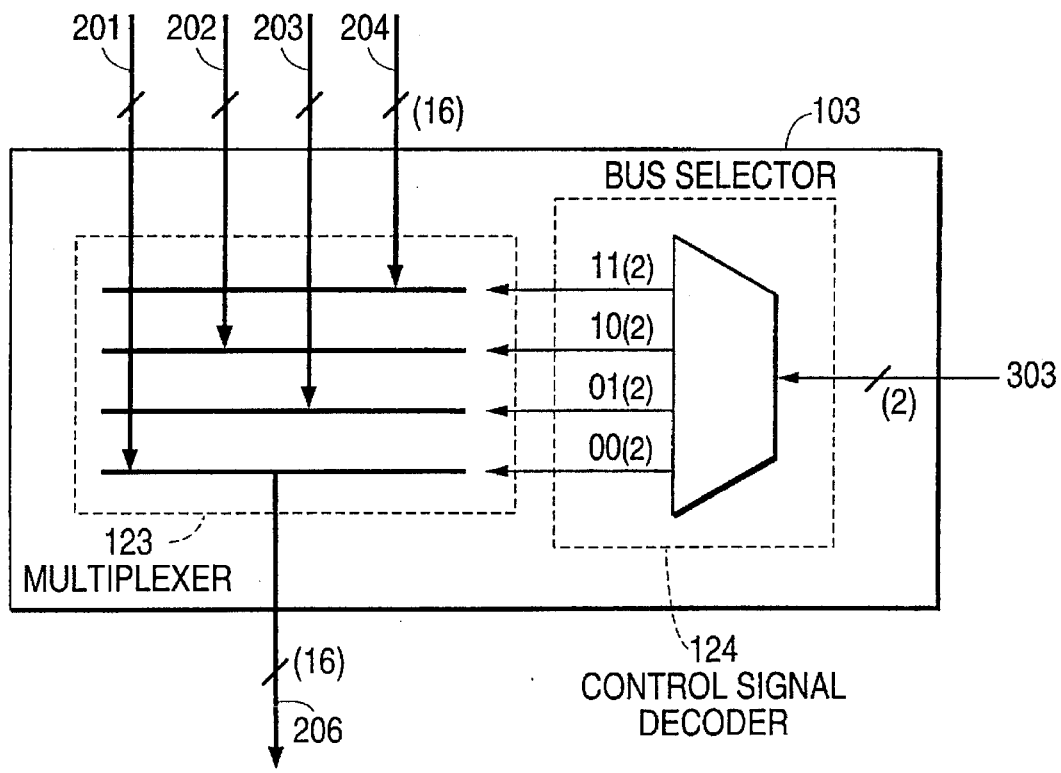
FIG. 6b is a block diagram of the second bus selector of FIG. 4.

As shown in FIG. 6(b), the second bus selector 103 comprises the second local data bus multiplexer 123 and the second bus selector control signal decoder 124. The entered MROM data bus MD bit (63 to 48), (31 to 16) and (15 to 0) field signals 201 through 204 are selected by the second bus selector control signal 303 to be generated to the second local data bus 206.

In this embodiment, when the second bus selector control signal 303 is the code "00", the MROM data bus MD bit (63 to 48) field 201 is selected, when it is the code "01" the MROM data bus MD bit (31 to 16) field 203 is selected, when it is the code "10", the MROM data bus 2 bit (47 to 32) field 202 is selected and when it is the code "11", the MROM data bus MD bit (15 to 0) field 204 is selected.

Further, the first output circuit 105 generates the microinstruction word lying on the first local data bus 205 to the bits (31 to 16) of the external data bus terminal in synchronism with the external clock signal, and the second output circuit 106 also generates the microinstruction word lying on the local data bus 206 to the bits (15 to 0) 209 of the external data bus terminal.

The arrangement of the microinstruction field of the MROM 101 is shown in Table 1, in which A denotes a microinstruction bit (63 to 48) field (A), (B) a microinstruction bit (47 to 32) field (B), (C) a microinstruction bit (31 to 16) field (C), (D) a microinstruction bit (15 to 0) field (D), and a subscript denotes the microinstruction field of the MROM addresses 0 to X–1.

TABLE 1

MROM

| MSB 63 | 48 47 | 32 31 | 16 15 | LSB 0 | |
|---|---|---|---|---|---|
| $A_0$ | $B_0$ | $C_0$ | $D_0$ | 0 | |
| $A_1$ | $B_1$ | $C_1$ | $D_1$ | 1 | MROM ADDRESS |
| . | . | . | . | . | |
| . | . | . | . | . | |
| . | . | . | . | . | |
| $A_{x-1}$ | $B_{x-1}$ | $C_{x-1}$ | $D_{x-1}$ | X–1 | |

Further, Table 2 illustrates the result achieved when, according to this embodiment, the microinstruction word of the MROM having the 64-bit long microinstruction word is generated to the 32-bit long external data bus terminal.

TABLE 2

| $C_0$ | $D_0$ | 1 | |
|---|---|---|---|
| . | . | . | |
| . | . | . | |
| . | . | . | |
| $C_{x-1}$ | $D_{x-1}$ | X | READING |
| $A_0$ | $B_0$ | X+1 | CLOCK NUMBER |
| . | . | . | |
| . | . | . | |
| . | . | . | |
| $A_{x-1}$ | $B_{x-1}$ | 2X | |
| 32 MSB | 16 15 | 0 LSB | |

EXTERNAL DATA BUS TERMINAL

When the reset signal 305 becomes effective, the bus selector/address controller 104 is initialized, and the first bus selector 102, in synchronism with the external clock, generates the microinstruction bit (31 to 16) field (C) to the first local data bus 205 while, at the same time, the second bus selector 103 generates the microinstruction bit (15 to 0) field (D) to the second local data bus 206. The carry signal 304 resulting, when the MROM address 301 is carried over from the most significant bit, causes the first bus selector 102 to generate the microinstruction bit (63 to 48) field (A) to the first local data bus 205 while, at the same time, the second bus selector 103 generates the microinstruction bit (47 to 32) field (B to the second local data bus 206.

In consequence, as shown in Table 2, it is seen that, when reading of the microinstruction word is repeated 2X times in synchronism with the external clock, all the microinstructions stored within the MROM can be generated to the 32-bit long external data bus terminal.

Figure 7:
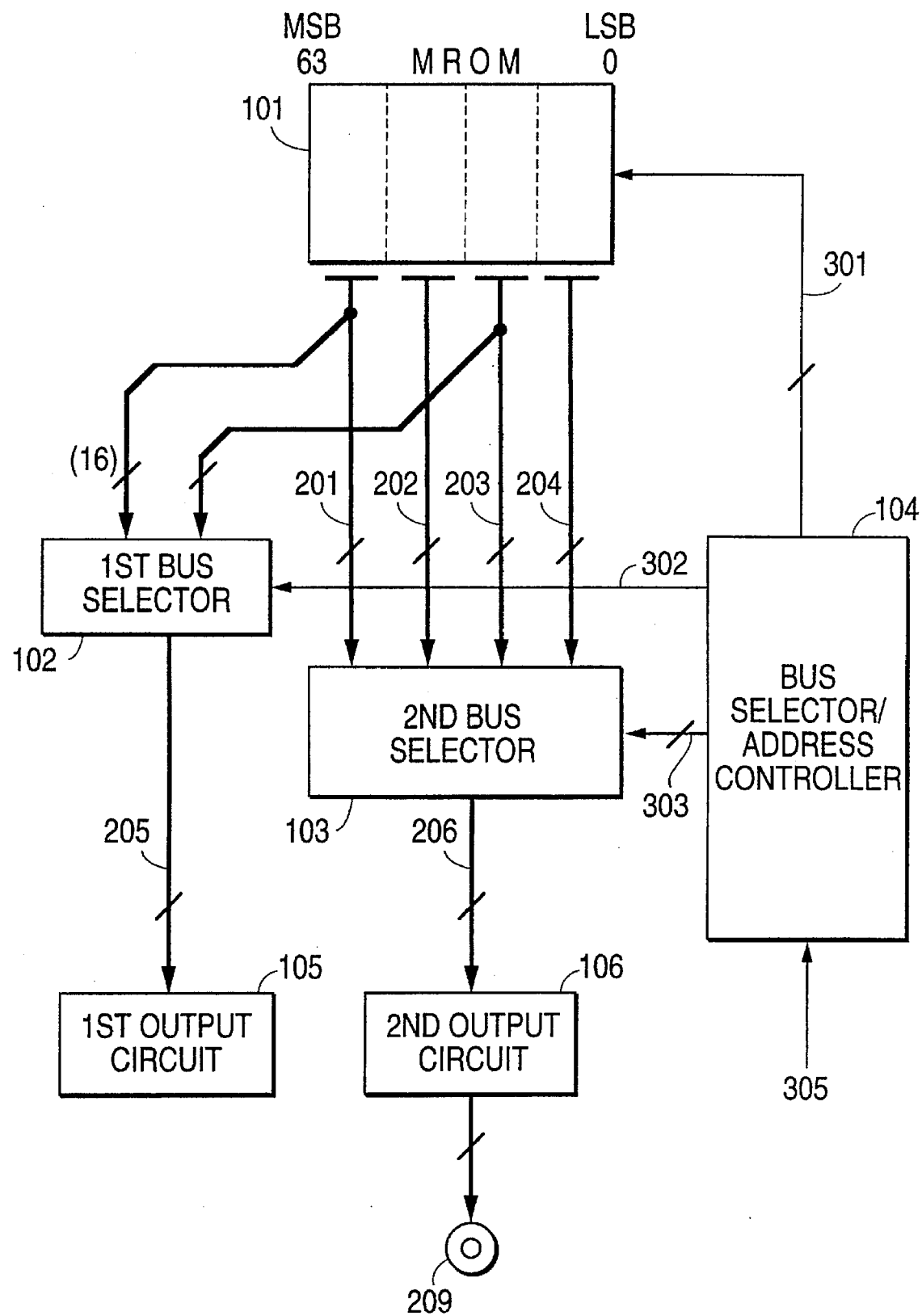
FIG. 7 is a block diagram of another microprogram memory according to the present invention.

FIG. 7 is a block diagram of a second embodiment of the present invention, in which the microinstruction word of the MROM having a 64-bit long microinstruction word is generated to the 16-bit long external data bus terminal. The arrangement of this embodiment is the same as that of FIG. 4, and only differs in that the output of the first output circuit 105 is not connected to the bits (31 to 16) 208 of the external data bus terminal. In this case, a result achieved when the 64-bit long microinstruction word of the MROM is generated to the 16-bit long external data bus terminal is illustrated in the Table 3.

TABLE 3

| $D_0$ | 1 | |
|---|---|---|
| . | . | |
| . | . | |
| . | . | |
| $D_{x-1}$ | X | |
| $B_0$ | X+1 | |
| . | . | |
| . | . | |
| . | . | |
| $B_{x-1}$ | 2X | READING |
| $C_0$ | 2X+1 | CLOCK NUMBER |
| . | . | |
| . | . | |
| . | . | |
| $C_{x-1}$ | 3X | |
| $A_0$ | 3X+1 | |
| . | . | |
| . | . | |
| . | . | |
| $A_{x-1}$ | 4X | |
| 15 MSB | 0 LSB | |

EXTERNAL DATA BUS TERMINAL

When the reset signal 305 becomes effective, the bus selector/address controller 104 is initialized, and the second bus selector 103, in synchronism with the external clock, generates the microinstruction bit (15 to 0) field (D) to the second local data bus 206. The carry signal 304 resulting when the MROM address 301 is carried over from the most significant bit causes the second bus selector 103 to sequentially generate the microinstruction bit (47 to 32) field (B), microinstruction bit (31 to 16) field (C) and microinstruction bit (63 to 48) field (A) to the second local data bus RD206. In consequence, as shown in Table 3, it is seen that, if reading of the microinstruction word is repeated 4X times in synchronism with the external clock, then all the microinstruction words stored within the MROM can be generated to the 16-bit long external data bus terminal.

What is claimed is:

1. A microprogram memory output circuit, comprising:
   a microprogram memory which stores a microinstruction word, said microinstruction word being designated by a respective microaddress and having a plurality of fields;
   a first bus selector for selecting one of said plurality of fields in accordance with a first control signal;
   a first output circuit for transferring an output of said first bus selector to a first external data bus;
   a second bus selector for selecting one of said plurality of fields in accordance with a second control signal;
   a second output circuit for transferring an output of said second bus selector to a second external data bus;
   a microaddress generator for generating a microaddress, said microaddress generator being operative to produce a carry signal and responsive to a reset signal; and
   a control signal generating unit for generating said first and second control signals, said control signal generating unit being responsive to said reset signal and said carry signal.

2. The microprogram memory output circuit according to claim 1, wherein said control signal generating unit is initialized when said reset signal becomes active, and generates said first control signal such that said first bus selector repeatedly selects, in succession, said second microinstruction field and said fourth microinstruction field, respectively, in synchronism with successive clock signals, and generates said second control signal such that said second bus selector repeatedly selects, in succession, said first microinstruction field, said third microinstruction field, said second microinstruction field, and said fourth microinstruction field, respectively, in synchronism with successive clock signals.

3. The microprogram memory output circuit according to claim 2, wherein said control signal generating unit is reset to a count of binary value "11" when said reset signal becomes active, and said control signal generating unit decrements said count to "10", "01" and "00", respectively, in synchronism with successive clock signals.

4. The microprogram memory output circuit according to claim 3, wherein a least significant bit of said count corresponds to said first control signal, and said count corresponds to said second control signal.

5. The microprogram memory output circuit according to claim 4, wherein:

said first bus selector is configured to select said second microinstruction field in response to said first control signal having a binary value of "1" and said fourth microinstruction field in response to said first control signal having a binary value of "0"; and said second bus selector is configured to select said first microinstruction field in response to said second control signal having a binary value of "11", said third microinstruction field in response to said second control signal having a binary value of "10", said second microinstruction field in response to said second control signal having a binary value of "01", and said fourth microinstruction field in response to said second control signal having a binary value of "00".

6. The microprogram memory output circuit according to claim 1, wherein said microaddress generator is initialized when said reset signal becomes active, and thereafter increments said microaddress by one in synchronism with successive clock signals.

7. The microprogram memory output circuit as in claim 6, wherein said carry signal is produced upon an occurrence of a carry over of a most significant bit of said microaddress.

8. The microprogram memory output circuit according to claim 1, wherein an output of said first output circuit is one of disconnected from said first external data bus and not otherwise provided, whereby each of said plurality fields is output only to said second external data bus through said second bus selector.

9. The microprogram memory output circuit according to claim 1, wherein the plurality of fields of said microinstruction word comprises four separate m-bit fields, wherein:

bit positions 0 through m−1 of said microinstruction word correspond to a first microinstruction field;

bit positions m through 2m−1 of said microinstruction word correspond to a second microinstruction field;

bit positions 2m through 3m−1 of said microinstruction word correspond to a third microinstruction field; and bit positions 3m through 4m−1 of said microinstruction word correspond to a fourth microinstruction field, m being an integer.

10. A microprogram memory output circuit, comprising:

a microprogram memory which divides an n-bit microinstruction word into four separate m-bit fields, with bit positions 0 through m−1 of said microinstruction word being a first microinstruction field, bit positions m through 2m−1 of said microinstruction word being a second microinstruction field, bit positions 2m through 3m−1 of said microinstruction word being a third microinstruction field, and bit positions 3m through 4m−1 of said microinstruction word being a fourth microinstruction field, n and m being integers, said microinstruction word being designated by a respective microaddress;

a first bus selector for selecting one of said fourth microinstruction field and said second microinstruction field in accordance with a first control signal;

a first output buffer for latching and transferring an output of said first bus selector to a first external data bus, said first external data bus being m bits in width;

a second bus selector for selecting one of said first microinstruction field, said second microinstruction field, said third microinstruction field and said fourth microinstruction field in accordance with a second control signal;

a second output buffer for latching and transferring an output of said second bus selector to a second external data bus, said second external data bus being m bits in width;

a microaddress generator for generating a microaddress, said microaddress generator being responsive to a reset signal and configured to produce a carry signal from said microaddress and a most significant bit of said microaddress; and a control signal generating unit for generating said first and second control signals, said control signal generating unit being responsive to said reset signal and said carry signal.

11. The microprogram memory output circuit according to claim 10, wherein said control signal generating unit is initialized when said reset signal becomes active, and generates said first control signal such that said first bus selector repeatedly selects said second microinstruction field and said fourth microinstruction field, respectively, in synchronism with a leading edge of an external clock signal, and generates said second control signal such that said second bus selector repeatedly selects said first microinstruction field, said third microinstruction field, said second microinstruction field and said fourth microinstruction field, respectively, in synchronism with the leading edge of the external clock signal.

12. The microprogram memory output circuit as in claim 11, wherein said control signal generating unit is reset to a count of binary value "11" when said reset signal becomes active, and said control signal generating unit decrements said count to "10", "01" and "00" respectively upon each occurrence of the leading edge of the external clock signal.

13. The microprogram memory output circuit as in claim 12, wherein a least significant bit of said count corresponds to said first control signal, and said count corresponds to said second control signal.

14. The microprogram memory output circuit according to claim 10 wherein said microaddress generator is initialized when said reset signal becomes active, and increments said microaddress by one in synchronism with a leading edge of an external clock signal.

15. The microprogram memory output circuit as in claim 10, wherein said microaddress generator includes address incrementing means for incrementing said microaddress in synchronism with a leading edge of an external clock signal, and wherein said carry signal is produced upon an occurrence of a carry over of the most significant bit of said microaddress.

16. The microprogram memory output circuit according to claim 10, wherein an output of said first output buffer is one of disconnected from said first external data bus and not otherwise provided, whereby each of said four separate m-bit fields is output only to said second external data bus through said second bus selector.

* * * * *